United States Patent [19]

Green et al.

[11] Patent Number: 5,404,094
[45] Date of Patent: Apr. 4, 1995

[54] WIDE INPUT POWER SUPPLY AND METHOD OF CONVERTING THEREFOR

[75] Inventors: John D. Green, Granville; John B. Hissong, Fredericktown; Michael L. Thompson, Newark, all of Ohio

[73] Assignee: Holophane Lighting, Inc., Newark, Ohio

[21] Appl. No.: 210,614

[22] Filed: Mar. 18, 1994

[51] Int. Cl.⁶ .............................................. G05F 1/40
[52] U.S. Cl. ..................................... 323/282; 361/91
[58] Field of Search ............... 323/282, 284, 285, 289, 323/351; 363/16, 18, 19, 20, 21, 50, 78, 80, 97, 131; 361/18, 79, 86, 87, 91, 93, 100

[56] References Cited

U.S. PATENT DOCUMENTS

| | | | |
|---|---|---|---|
| 4,172,260 | 10/1979 | Okabe et al. | 357/23 |
| 4,218,647 | 8/1980 | Haas | 361/18 |
| 4,408,267 | 10/1983 | Pruitt | 363/17 |
| 4,430,608 | 2/1984 | Nesler | 323/282 |
| 4,450,384 | 5/1984 | Krokaugger | 315/127 |
| 4,575,668 | 3/1986 | Baker | 323/282 |
| 4,672,228 | 6/1987 | Swoboda | 361/90 |
| 4,908,856 | 3/1990 | Poletto | 323/282 |
| 4,914,356 | 4/1990 | Cockram | 315/307 |
| 4,920,302 | 4/1990 | Konopka | 315/307 |
| 4,988,942 | 1/1991 | Ekstrand | 323/282 |
| 5,036,253 | 7/1991 | Nilssen | 315/151 |
| 5,041,767 | 8/1991 | Doroftei et al. | 315/292 |
| 5,144,202 | 9/1992 | Nilssen | 315/151 |
| 5,148,158 | 9/1992 | Shah | 340/825.17 |
| 5,150,014 | 9/1992 | Kastelein | 315/224 |
| 5,154,504 | 10/1992 | Helal et al. | 362/20 |
| 5,155,415 | 10/1992 | Schmidt et al. | 315/224 |
| 5,164,638 | 11/1992 | Denneman et al. | 315/224 |
| 5,182,503 | 1/1993 | Denneman et al. | 315/224 |
| 5,194,803 | 3/1993 | Visser et al. | 323/360 |

*Primary Examiner*—Thomas M. Dougherty
*Assistant Examiner*—Matthew V. Nguyen
*Attorney, Agent, or Firm*—Brooks & Kushman

[57] ABSTRACT

A method and system of converting a wide range of DC input voltages from a DC power source to a substantially lower regulated DC output voltage is disclosed. A pulse width modulated (PWM) signal is generated from an applied DC input voltage to obtain a desired regulated DC output voltage. The PWM signal has a fixed frequency and a variable duty cycle. The PWM signal is filtered to provide a DC output voltage proportional to the amount of time the PWM signal spent in the ON or HIGH state. The duty cycle of the PWM signal is controlled based on an error signal generated by comparing an error voltage level that is proportional to the output voltage to a voltage reference. High voltage protection is provided to the controller during the period the PWM signal is in the OFF or LOW state.

15 Claims, 4 Drawing Sheets

WIDE INPUT POWER SUPPLY AND METHOD OF CONVERTING THEREFOR

TECHNICAL FIELD

This invention relates to power supplies and more particularly to power supply systems that convert a wide range of DC input voltages to a substantially lower regulated DC output voltage.

BACKGROUND ART

On some occasions it is convenient or essential to be able to convert one DC voltage to another. For instance, in digital systems it is common to have +5 volts available at high current nearly everywhere, but it may be desirable to operate a single operational amplifier that needs only a few milliamps of ±15 volts DC. Or it may be desirable to operate some high-power equipment from a 12 volt automobile storage battery.

For DC sources of voltage, power supplies may employ DC to DC converters to convert unregulated DC voltage to regulated or controllable DC voltage. A typical converter utilized is the Pulse Width Modulated (PWM) Converter. These converters employ square-wave pulse width modulation to achieve voltage regulation by varying the duty cycle of the waveform. However, typical PWM converters can handle 40 VDC maximum.

A fluorescent lamp power supply is disclosed in U.S. Pat. No. 4,920,302, issued to Konopka. The power supply includes a converter for supplying power from a low voltage DC voltage source for operating a pair of fluorescent lamps. The on-time of the converter is controlled by a pulse width modulator circuit comprising dual comparators. A reference potential is applied to a potentiometer for controlling the output comparator conduction threshold and for varying the width of the pulses of the pulse width modulator. Variation of the reference potential changes the brightness of the fluorescent lamp. The system disclosed utilizes pulse width modulation to control the voltage output, however, it converts relatively low DC input voltages to high AC voltages.

A system for controlling the current supplied from a DC power source to high power illuminating lamps is disclosed in U.S. Pat. No. 4,450,384, issued to Krokaugger. The current fed to the lamp is controlled by manually setting the width of the pulsed output of a pulse width modulator by means of a potentiometer connected to the pulse width modulator. The power for the DC controller, which includes the pulse width modulator, is provided from the same DC power source and stepped down by a DC—DC converter. The system disclosed fails to describe the operation of the voltage step-down DC—DC converter. In addition, the brightness of the lamp requires manually setting the DC controller.

Although DC to DC converters are available as standard electronic devices, the maximum DC input voltage that can be applied to these commercial products may be 40 VDC. Therefore, power supplies are available that convert up to 40 VDC maximum to a lower regulated DC output voltage. A problem of the prior art is that commercial products are not available that encompass the substantially wide range of input voltages of the present invention.

DISCLOSURE OF THE INVENTION

It is thus a general object of the present invention to provide a method and system for converting a substantially wide range of DC input voltages from a DC power source to a substantially lower regulated DC output voltage.

In carrying out the above object, the present invention provides a switching regulator coupled to a PWM controller to produce a stepped-down DC output voltage via high frequency switching. The PWM controller is coupled to a high voltage protector to protect the PWM controller from the substantially high voltage inputs. The PWM controller controls or modifies the duty cycle of the switching regulator based on an error signal generated by comparing the DC output voltage to a predetermined voltage reference. The amount of time that the switching regulator is conducting determines the voltage output.

BRIEF DESCRIPTION OF THE DRAWINGS

The present invention will be apparent from the detailed description taken in conjunction with the accompanying drawings in which.

BEST MODES FOR CARRYING OUT THE INVENTION

Figure 1:
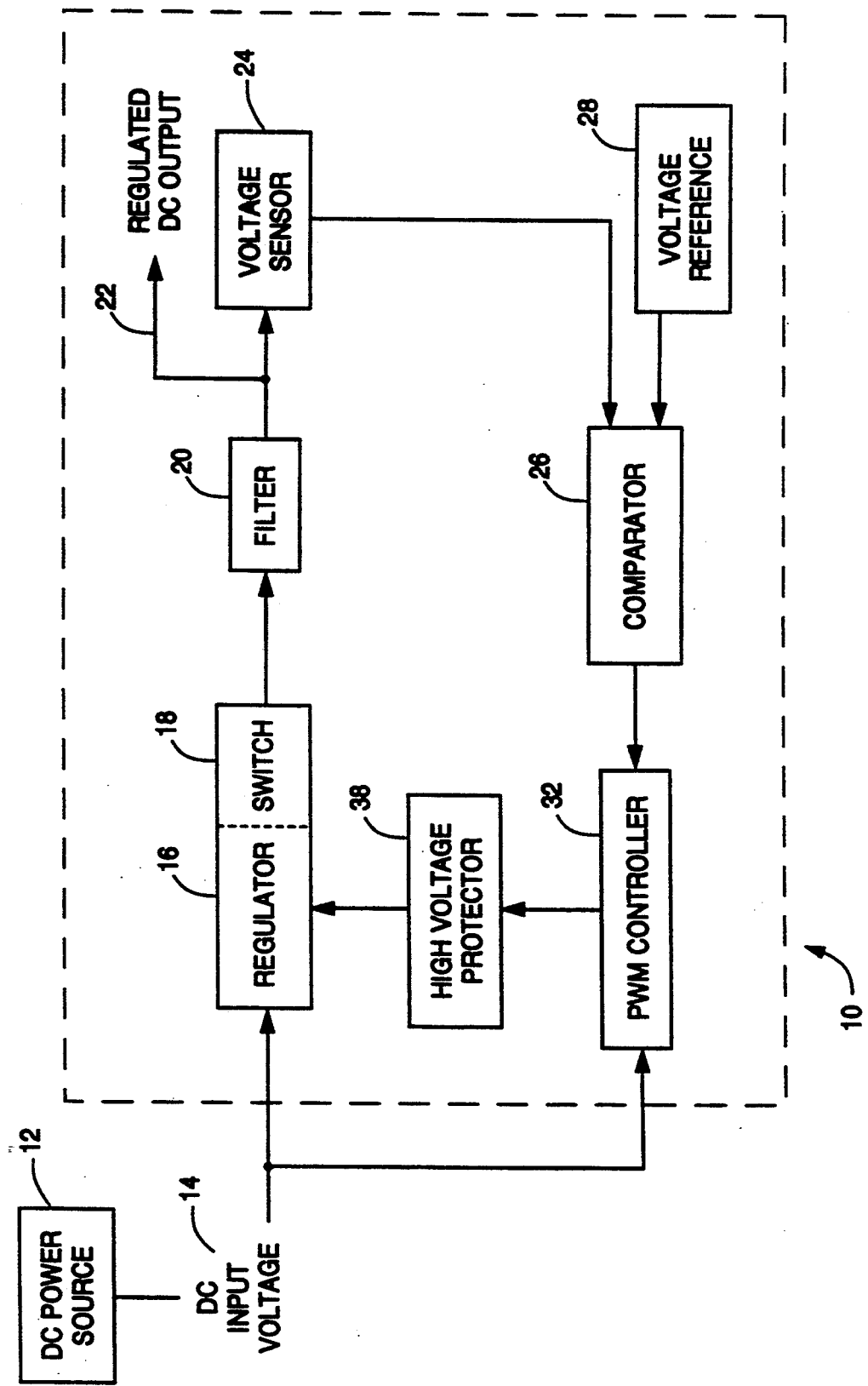
FIG. 1 is a block diagram of the preferred embodiment of the present invention.

FIG. 1 is a block diagram illustrating the operation of the present invention. A DC power source 12 having a DC input voltage 14 is applied to a switching regulator 16 at the input of the power supply system 10. The switching regulator 16 is utilized to generate a pulse width modulated (PWM) signal from the DC input voltage 14. As a result, the voltage output waveform of the switching regulator 16 is square wave in nature consisting of a train of pulses of fixed frequency, with a width proportional to the desired output power required. The switching regulator 16 includes at least one switch 18 capable of carrying high voltage inputs. The switch 18 preferably has a junction breakdown of at least 200 VDC for allowing high peak voltages.

The square wave voltage output of the switching regulator 16 may be applied to a filter 20 if a clean supply is desired. The filter 20 is used to produce a regulated DC output 22 proportional to the average time spent in the HIGH state as developed by the digital input code. The filter 20 may be a standard PI low-pass filter that limits the peak voltage excursion of the regulated DC output 22 and stores energy during the OFF time of the waveform. However, if the power supply system 10 is used to drive relays, solenoids, light emitting diodes (LEDs), or anything not sensitive to noise, the filter 20 may be eliminated.

A voltage sensor 24 is used to sense the regulated DC output 22. The sensed DC output 22 generates a feedback signal that is fed into a comparator 26. The comparator 26 compares the sensed DC output 22 to a predetermined voltage reference 28 to obtain a variable duty cycle drive signal for the switch 18. The comparator 26 then generates an error signal to be fed into a PWM controller 32.

The PWM controller 32 controls the switching rate of the switch 18 by modifying the duty cycle of the switching waveform (i.e., the ratio of ON time to OFF time) to change the DC output 22 in response to the error signal. When the switching regulator 16 is OFF, the full voltage of the DC power source 12 is applied directly to the PWM controller 32. Therefore, a high voltage protector 38 is coupled to the PWM controller 32.

As a result, the DC output 22 is kept at a constant predetermined voltage level through duty cycle control of the switch 18. The high voltage components utilized in controlling the duty cycle of the switch 18 allow the power supply system 10 to operate over a substantially wide range of input voltages.

Figure 2:
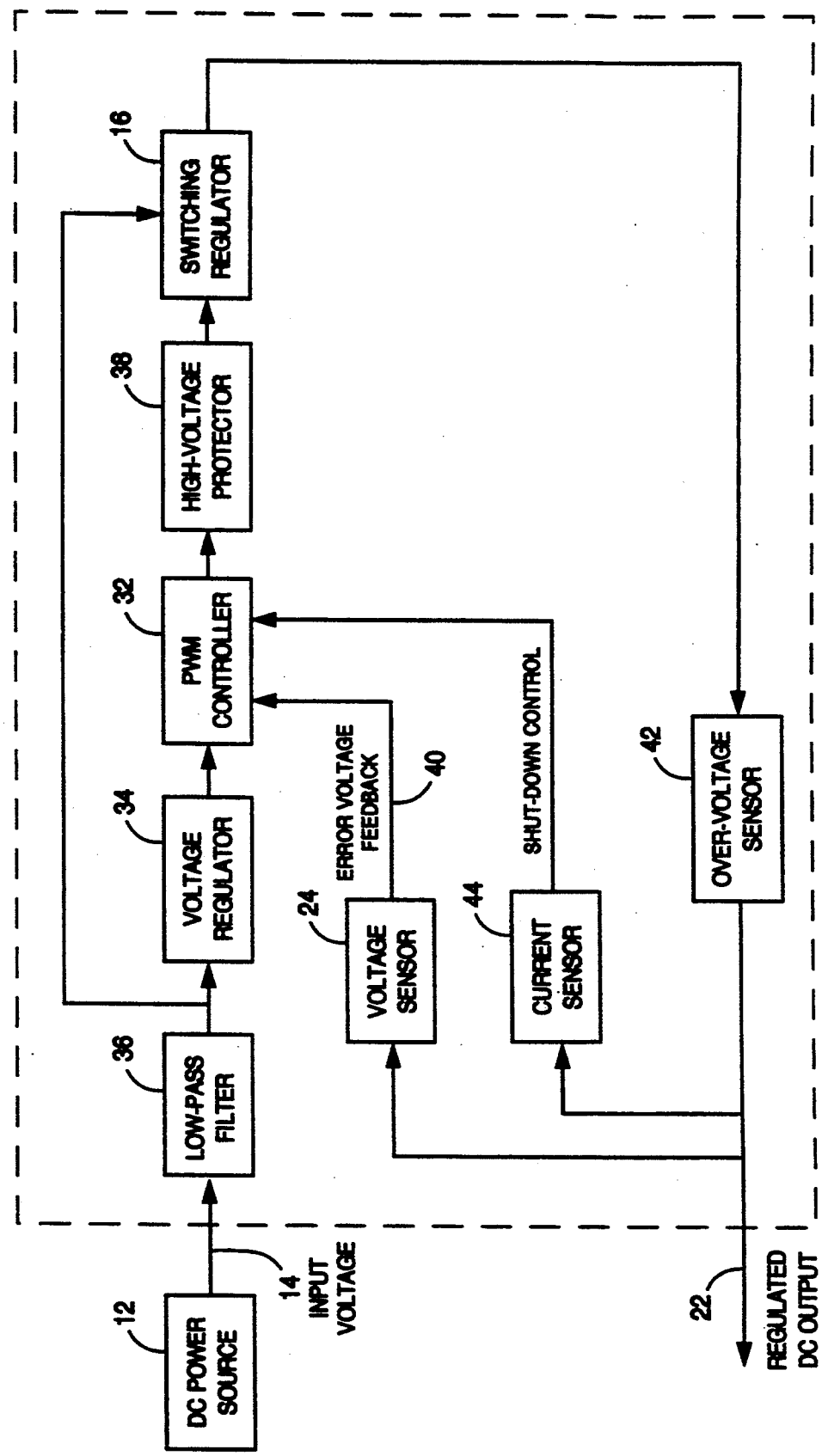
FIG. 2 is a block diagram of one embodiment of the present invention made in accordance with the teachings of the preferred embodiment of this invention.

A block diagram of the preferred embodiment of the present invention is illustrated in FIG. 2. The DC input voltage 14 is applied to a voltage regulator 34 via a low pass filter 36. The voltage regulator 34 is used to provide a stable voltage supply from the unregulated DC input voltage 14 to power the PWM controller 32. The low-pass filter 36 prevents PWM interference from feeding back to the DC power source 12. The low-pass filter 36 may be a conventional PI filter.

The wide range DC input voltage 14 is also directly applied to the switching regulator 16 via the low pass filter 36. The switching regulator 16 switches rapidly from saturation to open circuit in order to generate a low regulated DC output 22 from the substantially high unregulated DC input voltage 14 without the enormous power dissipation of a conventional linear series regulator.

The PWM controller 32 is coupled between the voltage regulator 34 and the switching regulator 16 to achieve voltage regulation. The switching regulator 16 is prevented from exceeding its voltage capability by the high voltage protector 38. The switching regulator 16 is coupled to the PWM controller 32 via the high voltage protector 38. When the switching regulator 16 is in the OFF state, the full voltage of the DC power source 12 is applied to the PWM controller 32. The high voltage protector 38 provides over voltage protection for the PWM controller 32.

A feedback signal 40 is fed from the switching regulator 16 to the PWM controller 32 via the voltage sensor 24. The voltage sensor 24 compares the DC output 22 from the switching regulator 16 with a stable predetermined reference. The PWM controller 32 then modifies the duty cycle of the switching waveform to change the output voltage in response to the comparison.

The over-voltage sensor 42 prevents excessive voltages from appearing on the DC output 22 if the switching regulator 16 should fail. The current sensor 44 will disable the PWM controller 32 and thus the DC output 22 if excessive current is drawn by a load placed on the output 22.

Figure 3:
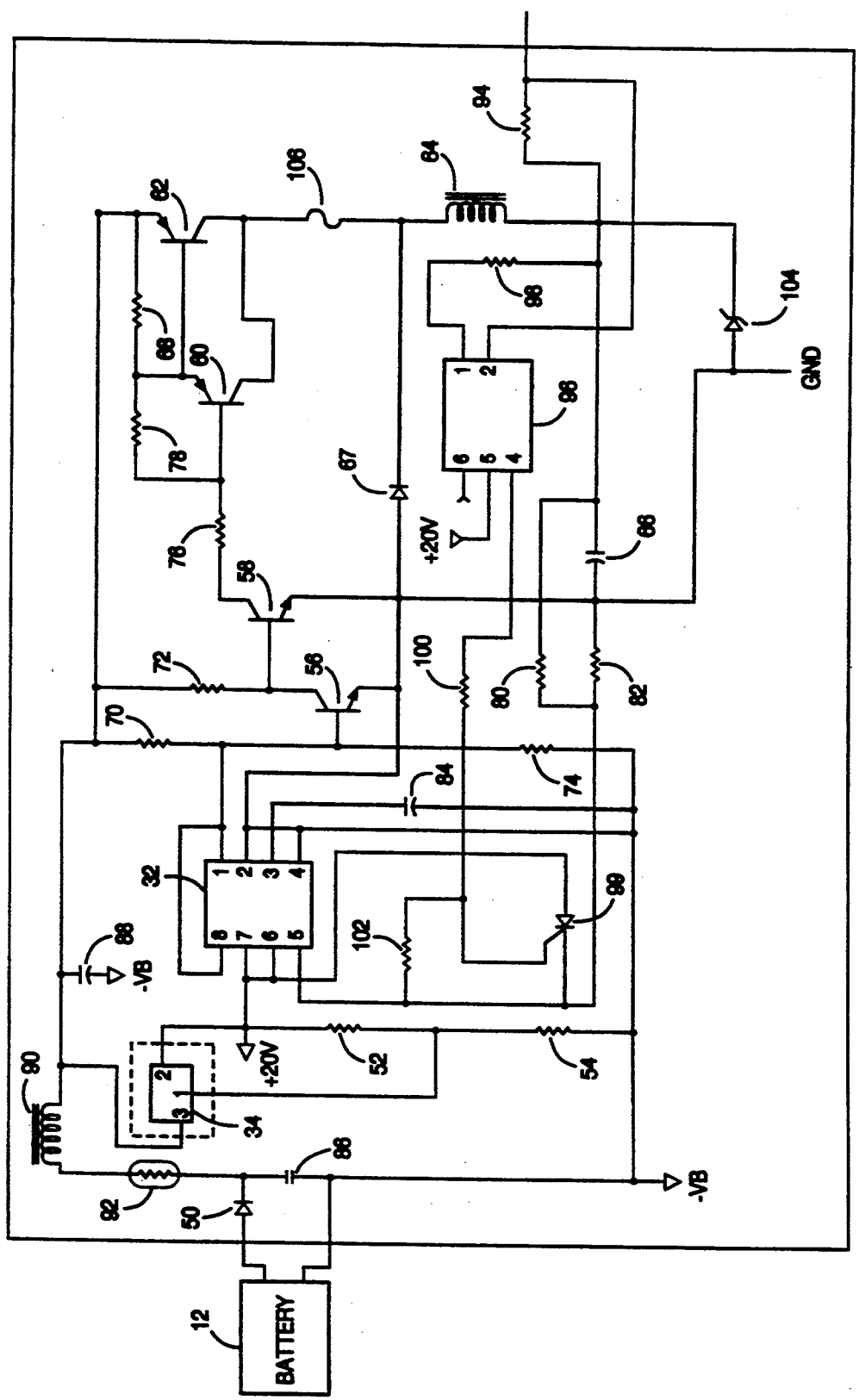
FIG. 3 is a schematic diagram of one embodiment of the present invention.

FIG. 3 is a schematic diagram of the preferred embodiment of the present invention. The uniqueness of this design is the wide range of DC voltage input. This invention uses the conventional PWM method of controlling the output potentials and a common DC to DC controller. The PWM controller 32 in the preferred embodiment is a Motorola MC34063. The Motorola MC34063 PWM controller 32 can tolerate a maximum of 40 VDC on its supply input. The PWM controller 32 is protected from excessive potentials with discrete components while still allowing it to control the output of the supply.

This circuit uses a diode 50 for reverse polarity protection on the DC voltage input. The diode 50 is preferably an MR754. If this circuit was converted into a full-wave bridge arrangement and a filter capacitor was added, the circuit could accept a wide range of AC or DC potentials.

The PWM controller 32 is powered at the input via the voltage regulator 34, preferably, Texas Instrument variable voltage regulator TL783C. The voltage regulator 34 can tolerate input to output differentials of up to 120 VDC. The resistors 52 and 54 set the output of the voltage regulator 34 to a nominal of 20 VDC to supply the PWM controller 32. These resistors, preferably 150 ohms and 2.2 kilohms, respectively, can have a tolerance as wide as $+/-20\%$ since the PWM controller 32 can handle up to 40 VDC on its supply pin.

The switching regulator 16 consists of transistors 60 and 62 (preferably 2N5416 and 15012, respectively). The transistors 60 and 62 have a junction breakdown specification of at least 200 VDC. The transistor 62 is the main "switch" connected in a Darlington arrangement with the transistor 60. A Darlington arrangement is used because of its suitability for high gain. The Darlington arrangement is also utilized to reduce the base drive requirements of the switching transistor 62. High voltage transistors typically have a fairly low current gain.

At start up, the transistor 62 is initially on. Since a sudden application of high voltage is applied to achieve a substantially low regulated DC output voltage, an inductor 64 is coupled to the collector of the transistor 62. The inductor 64 prevents the full DC input voltage from being applied at the output 22. Therefore, the inductor 64 limits the peak excursion of the output voltage. A capacitor 66, preferably 4700 microfarads, stores energy that powers the load during the time the PWM controller 32 is in an OFF state.

Coupled between the PWM controller 32 and the input of the inductor 64 is a diode 67. The diode 67 shunts the negative component of the back electromotive force from the inductor 66 to ground. The diode 67 is preferably an MR754.

A resistor 68 is coupled between the emitter of the transistor 62 and the emitter of the transistor 60. The resistor 68 preferably has a value of 220 kilohms.

The collector to base junctions of the transistors 56 and 58, preferably a 2N3439 each, protect the PWM controller 32 from excessive input potentials. Coupled between the DC power source 12 and the base of the transistors 56 and 58 are resistors 70 and 72. The resistor 70 is coupled between the DC power source 12 and the base of the transistor 56. The resistor 72 is coupled between the DC power source 12 and the base of the transistor 58. Both resistors 70 and 72 preferably have a value of 220 kilohms each. Resistors 74 and 70 form the base bias of the transistor 56. The resistor 74 preferably has a value of 100 kilohms. The base of transistor 56 is driven by the PWM output of the PWM controller 32. The transistor 58 is the base driver for the Darlington "switch" formed by transistors 60 and 62.

Coupled between the collector of the transistor 58 and the base of the transistor 60 is a resistor 76, preferably 10 kilohms. Coupled between the base of the transistor 60 and the emitter of transistor 60 is a resistor 78, preferably 220 kilohms. If the Darlington arrangement was not used, the resistor 76 would have to be a 15 W resistor and the overall circuit efficiency would be degraded.

Pin 1 of the PWM controller 32 is the PWM output derived from sensing the output potential into pin 5 via the voltage divider formed by resistors 80 and 82, preferably 20 kilohms and 2.32 kilohms, respectively. As soon as the output potential reaches a predetermined internal voltage threshold level, here 1.25 VDC, pin 1 of the PWM controller 32 shuts off the transistor 62. With conventional designs the PWM controller 32 must tolerate the full input potentials when the "switching component" is in the "OFF" (cutoff) state. Therefore, the high voltage protector 38 must be utilized when applying the substantially high input voltage to the power supply system 10.

A capacitor 84 is coupled to the PWM controller 32 to control the frequency of the switching of the transistor 62. The capacitor 84 preferably has a value of 68 picofarads.

This circuit will generate some reflected noise on to the source. A PI filter 36 is used between the supply input and the switching circuitry to reduce the reflected noise to a tolerable level. Capacitors 86 and 88 and inductor 90 form the PI filter used with the present invention. Capacitors 86 and 88 preferably have values of 0.01 microfarads and 220 microfarads, respectively, and inductor 90 preferably has a value of 250 microhenrys.

Depending on the output load and the input voltage level, there could be excessive input inrush currents on initial power up. Resistor 92 is an "inrush current limiter" and is placed in series with the DC power source 12. Its nominal ohmic value limits the initial start up current to a safe value. As it warms due to its power dissipation, the resistance of the resistor 92 decreases to a negligible value thus maintaining the overall circuit efficiency. This component is basically a thermistor with a negative temperature co-efficient.

With such a wide input to output differential, this circuit has the potential of causing catastrophic failure of the device(s) it is supplying. To help prevent this, the circuit employs two independent circuits to limit current and/or voltage.

Over-current protection is provided using a resistor 94, preferably 1 ohm, that senses the load current from the transistor 62 and will activate an opto-isolator 96 via a resistor 98, preferably 100 ohms, if the current exceeds 2.5 amps nominal. If the opto-isolator 96 is activated, it turns on silicon-controlled rectifier (SCR) 99 which shuts down the PWM controller 32. The SCR 99 is preferably an EC103B. The SCR 99 shuts down the PWM controller 32 by applying about 20 volts to the output voltage sense input, pin 7, of the PWM controller 32. Any level greater than 1.25 amp at this point forces a high input to output impedance of the circuit. It is necessary to remove the supply power to reset the circuit if this condition occurs. The resistors 100 and 102 are included in the over-current protection circuit. The resistors 100 and 102 preferably have a value of 10 kilohms and 1.2 kilohms, respectively.

Overvoltage protection is provided by the diode 104 coupled between ground and the output of the transistor 62 via a fuse 106. The diode 104 is a high energy zener diode, preferably a P6KE15A. Its breakover voltage is 14 VDC for this application. If the circuit output level exceeds 14 VDC for more than a couple hundred milliseconds, or the reaction time of the fuse 106, the fuse 106 will open and protect the load device. The over-current protection circuit has a faster response time than the fuse 106. If the fuse 106 is forced to open by the diode 104, it generally indicates a circuit failure.

Figure 4:
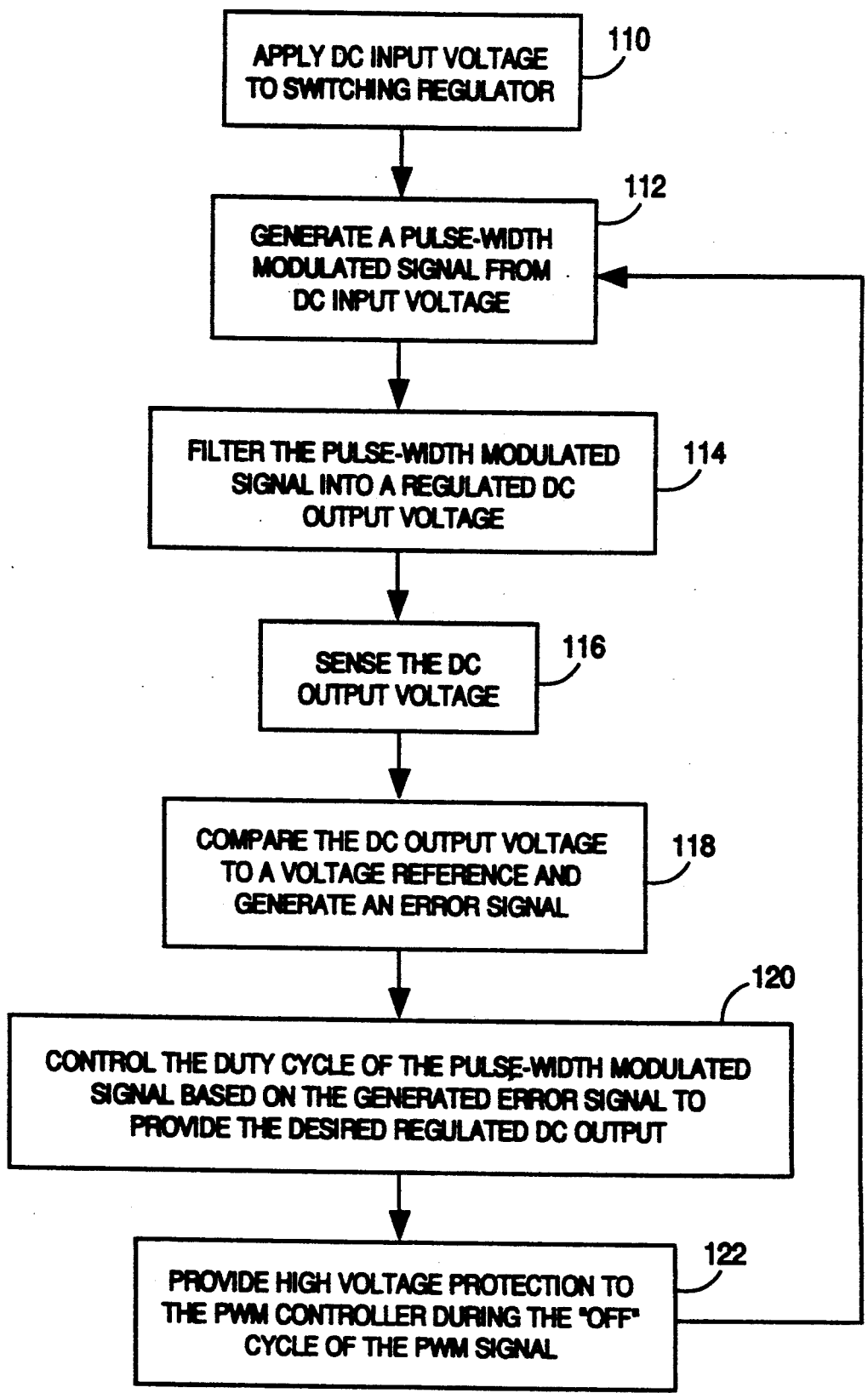
FIG. 4 is a flow chart illustrating the general sequence of steps associated with the operation of the present invention.

Finally, FIG. 4 illustrates the steps utilized in the method of converting a wide range of DC input voltages from a DC power source to a substantially lower regulated DC output voltage. A DC input voltage 14 is applied to the switching regulator 16 of the power supply system 10 as shown in block 110.

The next step is to generate a pulse width modulated (PWM) signal from the DC input voltage 14 as shown in block 112. Block 114 illustrates that the PWM signal is then filtered into the DC output voltage 22. Following the filtering step, the DC output voltage 22 is sensed as shown in block 116.

The sensed DC output voltage 22 is then compared to a predetermined voltage reference in order to generate an error signal as shown in block 118. The duty cycle of the PWM signal is controlled or modified based on the generated error signal as shown in block 120 to provide the desired regulated DC output.

Finally, high voltage protection is provided to the PWM controller 32 during the "OFF" cycle of the PWM signal as shown in block 122. The high voltage protector 38 allows the PWM controller 32 to operate over a substantially wide range of voltage inputs.

These steps are continuously repeated so that the switch 18 of the switching regulator 16 is repeatedly switched ON and OFF via the PWM controller 32 to maintain a regulated low DC output voltage.

While the best mode for carrying out the invention has been described in detail, those familiar with the art to which this invention relates will recognize various alternative designs and embodiments for practicing the invention as defined by the following claims.

What is claimed is:

1. A wide input power supply system that converts a wide range of DC input voltages from a DC power source to a substantially lower desired DC output voltage, the power supply system comprising:

a switching regulator coupled to the DC power source for generating a pulse width modulated signal having a fixed frequency and a variable duty cycle through a rapid rate of switching of the switching regulator between an OFF state and an ON state, the duty cycle representative of a voltage of the pulse width modulated signal;

a voltage sensor coupled to the switching regulator for sensing the voltage of the pulse width modulated signal;

a comparator coupled to the voltage sensor for comparing the voltage of the pulse width modulated signal to a predetermined voltage reference and generating an error signal;

a controller coupled between the DC power source and the comparator for controlling the duty cycle of the pulse width modulated signal by controlling the switching rate of the switching regulator to obtain the desired DC output voltage based on the generated error signal; and a high voltage protector coupled between the controller and the switching regulator for providing a high voltage protection to the controller from the wide range of DC input voltage from the DC power source when the switching regulator is switched to the OFF state.

2. The power supply system as recited in claim 1, further comprising:
   a filter coupled between the switching regulator and the voltage sensor for filtering the pulse width modulated signal to obtain a signal proportional to the average time the pulse width modulated signal spent in the ON state.

3. The power supply system as recited in claim 1, wherein the switching regulator includes at least one switch having a junction breakdown of at least 200 VDC.

4. The power supply system as recited in claim 3, wherein the switch includes a first pair of transistors connected in a Darlington arrangement.

5. The power supply system as recited in claim 1, wherein the high voltage protector includes a second pair of transistors connected in a Darlington arrangement.

6. The power supply system as recited in claim 1, wherein the comparator and the controller are combined in a single integrated circuit.

7. The power supply system as recited in claim 1, further comprising:
   a current sensor coupled between the switching regulator and the controller for sensing a current of the pulse width modulated signal; and
   a switch, response to the current sensor, for turning off the controller if excessive current is drawn by a load coupled to the desired DC output voltage.

8. The power supply system as recited in claim 7, wherein said switch is a silicon-controlled rectifier.

9. The power supply system as recited in claim 1, further comprising:
   an overvoltage sensor coupled to the switching regulator for sensing the voltage level of the desired DC output voltage; and
   a fuse, response to the overvoltage sensor, for providing an open circuit at the switching regulator.

10. The power supply system as recited in claim 9, wherein the overvoltage sensor is a high energy zener diode.

11. The power supply system as recited in claim 1, further comprising:
   a filter coupled to between the DC power source and the switching regulator for reducing reflected noise into the DC power source.

12. A wide input power supply system that converts a wide range of DC input voltages from a DC power source to a substantially lower desired DC output voltage, the power supply system comprising:
   a first pair of transistors coupled directly to the DC power source for generating a pulse width modulated signal having a fixed frequency and a variable duty cycle through a rapid rate of switching of the transistors between an OFF state and an ON state, the duty cycle representative of a voltage of the pulse width modulated signal, the first pair of transistors being connected in a Darlington arrangement;
   a voltage sensor coupled to the first pair of transistors for sensing the voltage of the pulse width modulated signal;
   a comparator coupled to the voltage sensor for comparing the voltage of the pulse width modulated signal to a predetermined voltage reference and generating an error signal;
   a controller coupled between the DC power source and the comparator for controlling the duty cycle of the pulse width modulated signal by controlling the switching rate of the switching regulator to obtain the desired DC output voltage based on the generated error signal; and
   a second pair of transistors coupled between the controller and the switching regulator for providing a high voltage protection to the controller from the wide range of DC input voltage from the DC power source when the switching regulator is switched to the OFF state, the second pair of transistors being connected in a Darlington arrangement.

13. A method of converting a wide range of DC input voltages from a DC power source to a substantially lower desired DC output voltage, the method comprising:
   generating a pulse width modulated signal from the DC input voltage having an ON state and an OFF state and having a fixed frequency and a variable duty cycle, the duty cycle representative of a voltage of the pulse width modulated signal;
   sensing the voltage of the pulse width modulated signal;
   comparing the sensed voltage of the pulse width modulated signal to a predetermined voltage reference and generating an error signal;
   controlling the duty cycle of the pulse width modulated signal based on the generated error signal to obtain the desired DC output voltage; and
   providing high voltage protection to the controller when the generated pulse width modulated signal is in the OFF state.

14. The method as recited in claim 13, wherein step of generating a pulse width modulated signal is performed by rapidly switching the DC input voltage ON and OFF.

15. The method as recited in claim 13, further comprising:
   filtering the generated pulse width modulated signal to obtain a signal proportion to the amount of time the pulse width modulated signal spent in the ON state.

* * * * *